April 23, 1963
D. J. COOPER
3,086,571
SEED POTATO AND PRODUCE CUTTER
Filed May 31, 1961
4 Sheets-Sheet 1
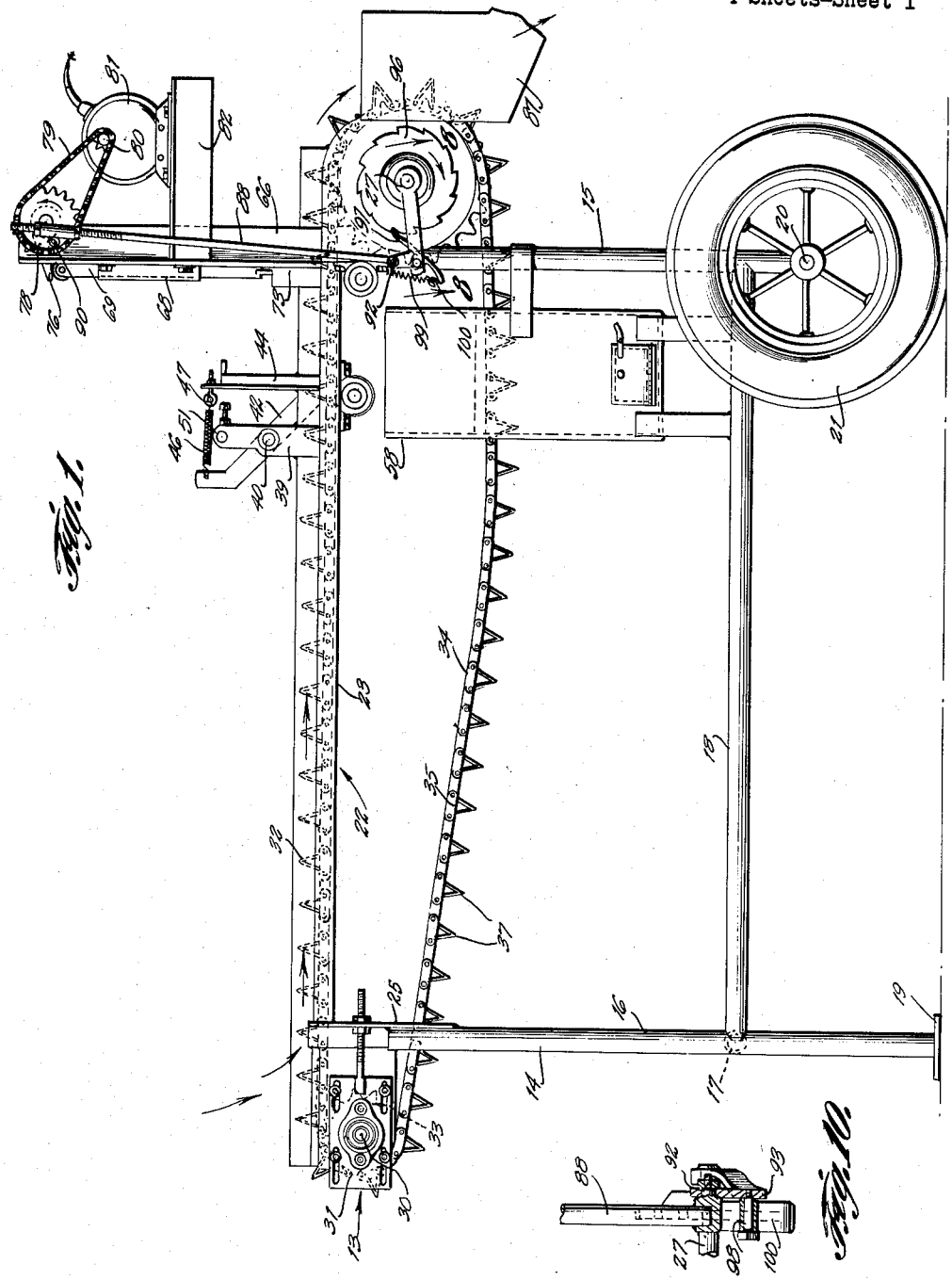
INVENTORS
DONALD J. COOPER
BY
*McMorrow, Berman & Davidson*
ATTORNEYS

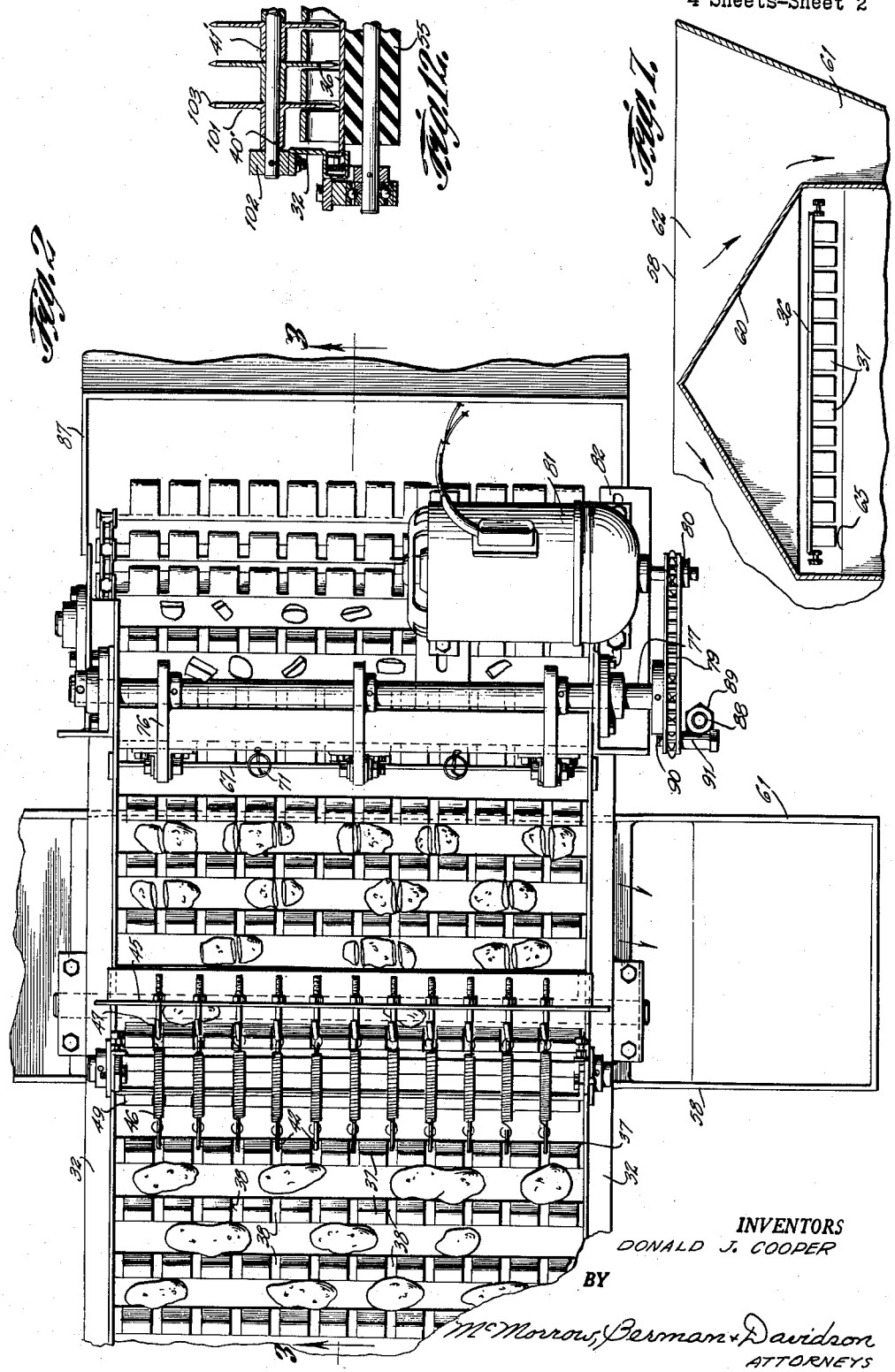

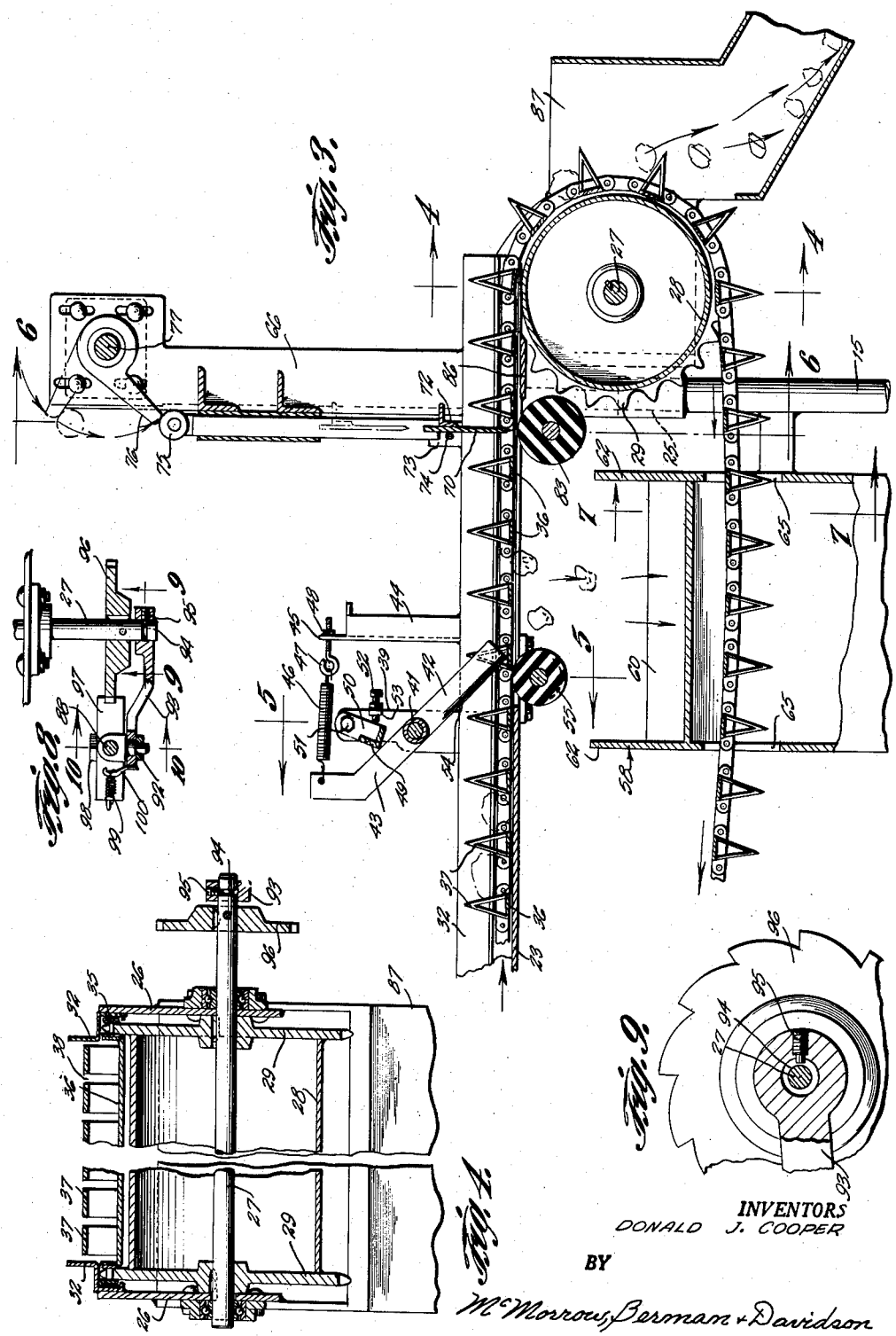

April 23, 1963 D. J. COOPER 3,086,571
SEED POTATO AND PRODUCE CUTTER
Filed May 31, 1961 4 Sheets-Sheet 4
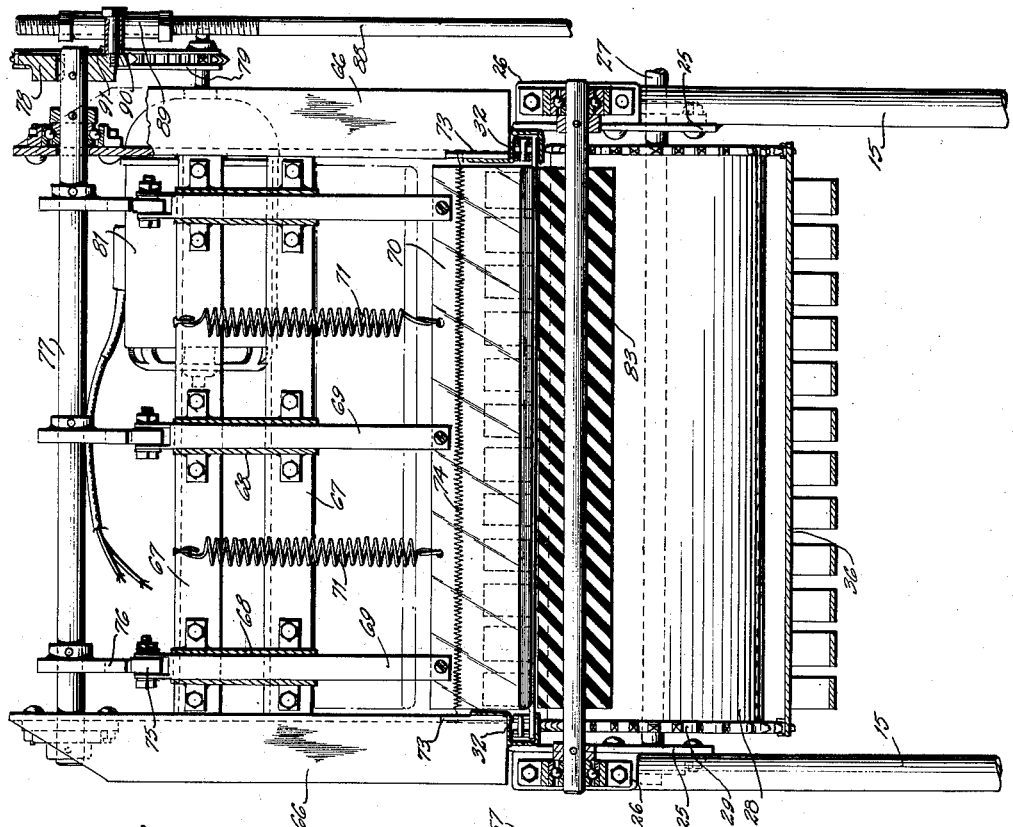
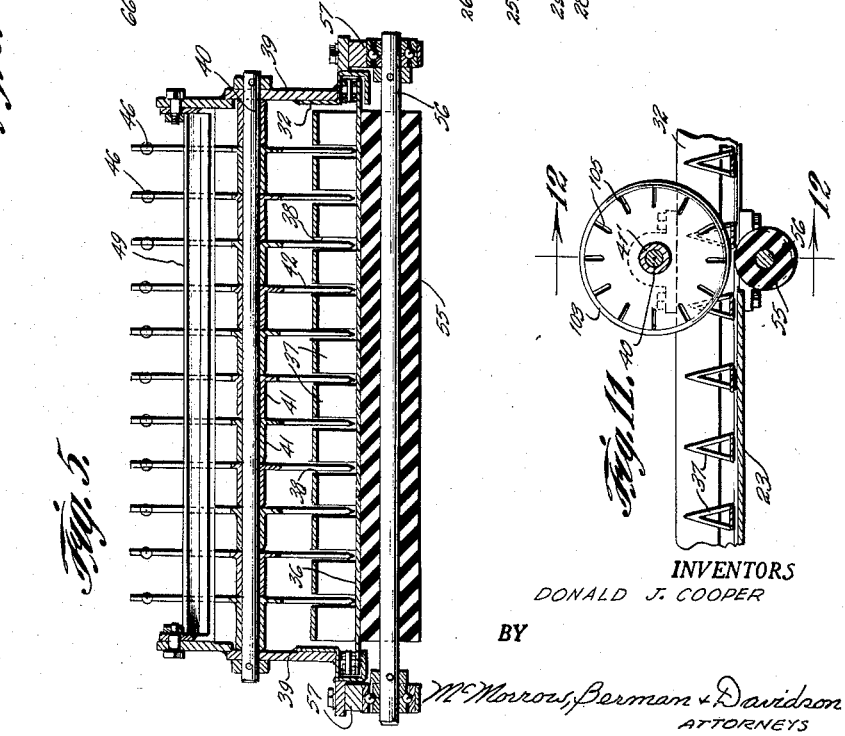
INVENTORS
DONALD J. COOPER
BY
McMorrow, Berman & Davidson
ATTORNEYS

United States Patent Office 3,086,571
Patented Apr. 23, 1963

3,086,571
SEED POTATO AND PRODUCE CUTTER
Donald J. Cooper, Oakley, Idaho, assignor of forty-nine percent to Arthur C. Bergener, Oakley, Idaho
Filed May 31, 1961, Ser. No. 113,862
5 Claims. (Cl. 146—155)

This invention relates to cutting machines, and more particularly to an apparatus for cutting up potatoes into portions containing eyes so that the aforesaid portions may be employed for planting, whereby each part having an eye will grow to produce a potato plant.

A main object of the invention is to provide a novel and improved machine for cutting seed potatoes or other produce into a plurality of parts, the machine being relatively simple in construction, having a large capacity, and operating to cut the seed potatoes or other produce both longitudinally and transversely.

A further object of the invention is to provide an improved apparatus for cutting seed potatoes or other produce into a plurality of parts, the apparatus being relatively inexpensive to fabricate, being durable in construction, being relatively compact in size, and accommodating potatoes or other produce of various sizes and shapes so that it is not necessary to accurately grade the potatoes or other produce prior to cutting.

A still further object of the invention is to provide an improved cutting machine for seed potatoes or other produce which is relatively portable, which requires a minimum amount of human supervision, and which minimizes weight.

Further objects and advantages of the invention will become apparent from the following description and claims, and from the accompanying drawings, wherein:

FIGURE 1 is a side elevational view of an improved produce cutting machine constructed in accordance with the present invention.

FIGURE 2 is a fragmentary top plan view of the produce cutting machine illustrated in FIGURE 1.

FIGURE 3 is a vertical cross sectional view taken substantially on the line 3—3 of FIGURE 2.

FIGURE 4 is a fragmentary transverse vertical cross sectional view taken substantially on the line 4—4 of FIGURE 3.

FIGURE 5 is a transverse vertical cross sectional view taken substantially on the line 5—5 of FIGURE 3.

FIGURE 6 is a transverse vertical cross sectional view taken substantially on the line 6—6 of FIGURE 3.

FIGURE 7 is a transverse vertical cross sectional view taken substantially on the line 7—7 of FIGURE 3.

FIGURE 8 is an enlarged cross sectional detail view taken substantially on the line 8—8 of FIGURE 1.

FIGURE 9 is an enlarged cross sectional detail view taken substantially on the line 9—9 of FIGURE 8.

FIGURE 10 is a cross sectional detail view taken on the line 10—10 of FIGURE 8.

FIGURE 11 is a fragmentary longitudinal vertical cross sectional view taken through a portion of a produce cutting machine constructed in accordance with the present invention but illustrating a modified cutting blade assembly which may be employed therewith.

FIGURE 12 is a fragmentary vertical cross sectional view taken substantially on the line 12—12 of FIGURE 11.

Referring to the drawings, 13 generally designates a produce cutting machine constructed in accordance with the present invention. The machine 13 comprises a generally rectangular frame 14 consisting of a pair of front post members 15, 15, a pair of rear post members 16, 16 connected by a transverse rod 17, and longitudinal rod members 18 connecting the front and rear post members 15 and 16. The bottom ends of the rear post members 16 are provided with supporting pads 19 and journaled on the ends of a transverse axle 20 secured to the bottom ends of the post members 15 are respective supporting wheels 21, 21.

Designated generally at 22 is a belt conveyor assembly which is mounted on the top of the frame 14. The belt conveyor 22 comprises a stationary platform portion 23 which is supported on the top ends of the posts 15 and 16 by suitable depending vertical brackets, such as the depending angle bars 25.

Journaled between brackets 26, 26 secured to the top portions of the front post members 15, 15 is a shaft 27 on which is mounted a belt supporting drum 28 provided at its ends with respective driving sprockets 29, 29. At the rear end of the belt conveyor assembly 22 a transverse shaft 30 is journaled between a pair of adjustable brackets 31, 31 carried by the end portions of longitudinal marginal angle bars 32, 32 provided at the longitudinal margins of the platform member 23.

A belt supporting drum provided with end sprockets 33 is mounted on the shaft 30.

An endless conveyor belt, designated at 34, is supported on the respective pairs of sprockets 29, 29 and 33, 33, the belt comprising sprocket chains 35, 35 which are engaged on the sprockets and which are connected by transversely extending bars 36, each bar being provided with a row of outwardly projecting triangular projections 37, the bars 36 being spaced apart longitudinally by uniform distances, said distances being sufficient to receive potatoes between the respective transverse rows of outwardly extending projections 37, as shown in FIGURE 2. The spacing between the transversely extending rows of projections 37 however is small enough to retain potatoes of average size therebetween so that the potatoes will be moved with the belt conveyor during the operation of the machine. The belt conveyor moves in a clockwise direction, as viewed in FIGURE 1, whereby the top run of the conveyor moves to the right, as viewed in FIGURE 1, namely, from the rear portion of the frame 14 toward the front portion thereof.

As shown in FIGURE 2, the transversely extending rows of projections 37 are uniformly spaced in a transverse direction, defining longitudinally aligned spaces 38 therebetween. A pair of transversely aligned upstanding arms 39, 39 are secured to the vertical flanges of the angle bars 32, 32 at the forward portion of the machine, and mounted between the top portions of the arms 39, 39 is a transversely extending shaft 40. Rotatably mounted on the shaft 40 are the successive sleeve elements 41 formed at their ends with the respective depending blade members 42 and with the upstanding arm portions 43, the sleeve members 41 serving as spacing means to align the blades 42 with the spaces 38 between the adjacent projections 37, as shown in FIGURE 5. A transversely extending bracket 44 is secured to the vertical flanges of the angle bars 32 forwardly of the arms 39, said brackets including a transverse top flange 45 projecting vertically upwardly, as shown in FIGURE 3. Respective biasing springs 46 connect the top ends of the arms 43 to eye bolts 47 engaged through the flange 45, the eye bolts 47 being provided with retaining nuts 48, as shown in FIGURE 3. A transversely extending abutment bar 49 engages the top edge portions of the arms 43, said abutment bar 49 being provided with end lugs 50 which are pivotally connected to the top ends of the arms 39 by pivot bolts 51, the lugs 50 being engaged by adjustable stop screws 52 threaded through transversely extending lugs 53 provided on the margins of the arms 39, whereby to limit the counterclockwise rotation of the bracket member 49, as viewed in FIGURE 3. Thus, the springs 46 bias the blades 42 in a clockwise direction, as viewed in FIGURE 3, to positions limited by the engagement of the top edge portions of the arms 43 with the transverse abutment bar 49. The blade elements 42 are yieldable in a counterclockwise direction, as viewed in FIGURE 3, against the biasing force of the springs 46. As shown in FIGURE 5, the blade elements 42 depend sufficiently so that they are substantially fully receivable between the projections 37 as the conveyor belt moves, whereby potatoes carried with the belt will be cut in planes extending longitudinally and vertically by the cutting edges 54 of the downwardly and forwardly inclined blade members 42.

A transverse supporting roller 55 is mounted on a shaft 56 journaled in bearing brackets 57, 57 secured to the longitudinal angle bars 32, 32 adjacent the vertical upstanding arms 39, 39, as shown in FIGURE 5. As shown in FIGURE 3, the platform element 23 is cut away rearwardly adjacent the blades 42 and the roller 55 is positioned directly beneath the lower end portions of the blade edges 54. The roller 55 thus serves as a cutting support, cooperating with the blades 42 to support the potatoes while they are being cut as the conveyor belt moves. The space forwardly of the roller 55 is open and if the segments of the potato cut by the blades 42 are sufficiently small to drop between the transverse rows of projections 37, said segments will drop downwardly and will be received in a guide chute 58 mounted on the frame 14 subjacent the cut-way portion of the platform element 23, as shown in FIGURE 3.

As shown in FIGURE 7, the guide chute 58 comprises the upwardly convergent plate elements 60, 60 which extend symmetrically on opposite sides of the longitudinal vertical central plane of the machine and which act to guide the cut segments of potatoes downwardly on opposite sides of the machine toward receiving chutes 61 provided at said opposite sides. The guide chute 58 is provided with the transversely extending vertical walls 62, 62 which act to retain the cut potato segments on the sloping guide walls 60 as the segments gravitate downwardly toward the reeciving chutes 61. As shown in FIGURES 3 and 7, the transverse vertical wall elements 62 are suitably apertured, as shown at 65, 65 to receive the bottom run of the conveyor belt therethrough.

As will be readily apparent, suitable receptacles may be provided beneath the discharge ends of the receiving chutes 61 to collect the cut potato segments.

Rigidly secured to the forward portions of the vertical flanges of the longitudinal angle bars 32 are respective upstanding supporting arms 66, 66, said supporting arms being connected by transverse bar members 67. Secured to the bar members 67 are a plurality of vertical guide sleeves 68, spaced in the manner illustrated in FIGURE 6, in which are slidably disposed respective vertical bar members 69 to the lower ends of which are connected a transversely extending vertical cutting blade 70. The cutting blade 70 is biased upwardly by coiled springs 71, 71 connecting the portions of the blade 70 on opposite sides of the intermediate bar member 69 to the uppermost transverse bar 67, as shown in FIGURE 6, the blade 70 being guided between a transversely extending angle bar 72 connecting a pair of upstanding arms 73, 73 secured to the vertical flanges of the longitudinal angle bars 32, 32, and a coiled spring 74 secured between the arms 73, 73, the blade member 70 being slidably received between the coiled spring 74 and the transverse angle bar 72, as is clearly shown in FIGURE 3.

Journaled to the top ends of the vertical guide bars 69 are respective rollers 75 which are engageable by pawl arms 76 secured on a transverse shaft 77 journaled in the top ends of the upstanding arms 66. A sprocket wheel 78 is secured on one end of shaft 77, the sprocket wheel 78 being driven by a sprocket chain 79 which is engaged on a driving sprocket 80 carried on the shaft of an electric motor 81 mounted on a bracket 82 secured to the adjacent upstanding arm 66, as shown in FIGURE 1. As will be readily apparent, the motor 81 drives shaft 77, the direction of drive being in a counterclockwise direction, as viewed in FIGURE 3, so that the pawl arms 76 intermittently engage the rollers 75 and move the bars 69 downwardly a sufficient distance to cause the blade member 70 to travel to a point substantially at the level of the transverse bar elements 36 associated with the conveyor projections 37 adjacent thereto, as shown in FIGURE 3. At this point the ends of the pawl arms 76 slip past the rollers 75, allowing the springs 71 to elevate the blade 70 to a sufficient height to allow the projections 37 of the belt conveyor to pass beneath the blade. As the pawl arms 76 rotate sufficiently, they again engage the rollers 75, moving the cutting blades 70 downwardly, to repeat the cycle.

A transverse supporting roller 83 is journaled in the frame 14 immediately beneath the vertically reciprocating cutting blade 70 to provide a cutting support so as to enable the blade 70 to make a vertical cut through potato segments positioned beneath the blade 70. This vertical cut is in addition to the longitudinal cuts provided by the blades 42, and previously described. Thus, if the longitudinally cut segments are too large to drop downwardly into the chute 58, such segments will be moved forwardly to be further cut by the vertically reciprocating blades 70, cooperating with the supporting roller 83, to be ultimately discharged from the forward end of the conveyor.

As shown in FIGURE 3, the platform element of the conveyor is restored, as indicated at 86, to support the cut potato segments until they are moved off the conveyor into a suitable discharge chute 87 provided at the forward end of the conveyor and serving to guide the cut potato segments toward a suitable collection receptacle.

The conveyor belt is actuated in a step-wise manner to move same through a distance corresponding to the spacing between two successive transverse rows of projections 37 simultaneously with the vertical reciprocation of the transverse vertical cutting blades 70. The actuating mechanism for moving the conveyor belt comprises a pawl rod 88 which is secured in a sleeve member 89 pivoted to a peripheral portion of the sprocket wheel 78 at 90. Thus, the sleeve 89 is provided with the transverse pivot sleeve 91 rigidly secured to its intermediate portion and the headed pivot bolt 90 extends rotatably through the pivot sleeve 91 and is threadedly engaged in a peripheral portion of the sprocket wheel 78, being suitably shouldered to allow the sleeve 91 to rotate freely with respect to the bolt. The rod 88 is pivotally connected at its lower end, as shown at 92, to the top end of the upstanding arm of an L-shaped link member 93, the opposite end of link member 93 being rotatably connected to the end of shaft 27. Thus, as shown in FIGURE 8, the end of shaft 27 is formed with an annular groove 94, and the groove portion of shaft 27 is rotatably received in a bore provided in the end of the link member 93, a retaining screw 95 being threadedly engaged in the end of the link and being partially received in the groove 94 to retain the link 93 rotatably connected with the shaft 27. A ratchet disc 96 is secured on the shaft 27, the periphery of said disc being engaged by the upper end of a pawl lever 97 pivoted to the corner portion of link member 93, for example, by a transverse pivot bolt 98, as shown in FIGURE 8. The lower end of the pawl lever 97 is connected by a coiled spring 99 to a lug 100 secured to the top end of the upstanding arm of the L-shaped link member 93, biasing the pawl lever 97 in a clockwise direction, as viewed in FIGURE 1, so that the upper end of the pawl lever 97 is continuously urged against the periphery of the ratchet disc 96. The sprocket wheel 78 rotates in a counterclockwise direction, as viewed in FIGURE 1, causing the rod 88 to reciprocate, whereby the pawl arm 100 alternately moves upwardly and downwardly, advancing the ratchet disc 96 in a clockwise direction, as viewed in FIGURE 1, one step with each upward movement of the pawl lever. This moves the conveyor belt in a corresponding step-wise manner, advancing the conveyor belt through a distance corresponding to the spacing between two pairs of successive transverse rows of projections 37 with each revolution of the sprocket wheel 78. Simultaneously, the transverse vertical blade member 70 is reciprocated through a complete cycle of vertical reciprocation so that the downward movement of the blade 70 is properly timed in accordance with the advancement of the conveyor belt, the blade being arranged so that it descends between a pair of adjacent rows of transverse projections 37, as shown in FIGURE 3.

In operation, the potatoes to be cut up are supplied to the left end portion of the conveyor belt as viewed in FIGURE 1, from a suitable supply hopper, not shown, and are moved to the right, as viewed in FIGURE 1, by the intermittent operation of the conveyor belt, as previously described. The potatoes are received between adjacent transverse rows of spaced projections 37 in the manner illustrated in FIGURE 2, the potatoes being of different lengths, as shown. As the potatoes are moved past the inclined vertical cutting blades 42, the potatoes are segmented so that the maximum length of the segments is no greater than the spacing between the blades 42. As previously mentioned, if the potatoes are sufficiently small in width they may then drop through the transverse rows of projections 37 into the receiving chute 58. Potatoes which are too wide to drop between the transverse rows of projections 37 are moved forwardly so that they eventually are located over the roller 83 and are vertically cut by the action of the vertically reciprocating transverse blade 70. The resultant segments are then advanced forwardly and ultimately delivered into the receiving chute 87 at the forward end of the conveyor.

As shown in FIGURES 11 and 12, instead of employing the transversely spaced inclined vertical yieldable pivoted cutting blades 42, a series of circular cutting discs 101 may be rotatably mounted on a transversely extending shaft 40' which is secured in and supported on respective brackets 102 mounted on the upstanding flanges of the members 32 at the opposite sides of the machine. The cutting discs 101 are provided with integral spacer sleeves 41' which maintain the discs 101 accurately spaced apart so that they are receivable in the spaces 38 between the adjacent projections 37. As shown in FIGURE 12, the discs 101 are sufficiently large in diameter so that their sharpened peripheral edges 103 extend relatively closely adjacent to the projecting supporting bars 36. The discs 101 are located immediately above the supporting roller 55, and the cutting action of the discs is generally similar to the cutting action provided by the inclined vertical blades 42 in the previously described form of the invention. However, the discs 101 are freely rotatable so that instead of yielding in the manner of the pivoted inclined vertical discs 42, they rotate as the potatoes pass therebeneath. The cutting action of the discs 101 is facilitated by the provision of radial slots 105 in the discs, said slots being located adjacent to the continuous peripheral cutting edge 103 of each disc.

While certain specific embodiments of an improved potato cutting machine have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A seed potato cutting machine comprising a support, a stationary platform on said support, an endless belt conveyor rotatable about spaced horizontal axes positioned so that the upper run overlies and is spaced from and adjacent to said platform and the lower run is below and spaced from and adjacent said platform with said axes at opposite ends of said platform, said conveyor having extending thereabout a plurality of transversely-extending bars, the bars being spaced longitudinally apart uniform distances, each bar being provided with a row of outwardly-extending projections, the rows of the respective projections being in longitudinal alignment, the said distances between the respective bars being sufficient to receive potatoes between said transverse rows of projections, a transverse row of depending blade elements carried by said support and disposed over the upper run of said conveyor and registering longitudinally with the spaces between the projections, a vertically reciprocable transverse vertical blade member mounted on the support adjacent the discharge end of the belt conveyor and overlying same, and means to intermittently drive said belt conveyor in steps corresponding substantially to the longitudinal spacing between said transverse rows and to simultaneously reciprocate said transverse blade member through a vertical stroke sufficient to cut through a potato on the belt conveyor.

2. A seed potato cutting machine comprising a support, a stationary platform on said support, an endless belt conveyor rotatable about spaced horizontal axes positioned so that the upper run overlies and is sapced from and adjacent to said platform and the lower run is below and spaced from and adjacent to said platform with said axes at opposite ends of said platform, said conveyor having extending thereabout a plurality of transversely-extending bars, the bars being spaced longitudinally apart uniform distances, each bar being provided with a row of outwardly-extending projections, the rows of the respective projections being in longitudinal alignment, the said distances between the respective bars being sufficient to receive potatoes between said transverse rows of projections, a transverse row of depending blade elements carried by said support and disposed over the upper run of said conveyor and registering longitudinally with the spaces between the projections, a vertically reciprocable transverse vertical blade member mounted on the support adjacent the discharge end of the belt conveyor and overlying same, means to intermittently drive said belt conveyor in steps corresponding substantially to the longitudinal spacing between said transverse rows and to simultaneously reciprocate said transverse blade member through a vertical stroke sufficient to cut through a potato on the belt conveyor, and respective transverse supporting rollers underlying the belt conveyor subjacent the transverse row of depending blade elements and the vertically reciprocable transverse blade member.

3. A seed potato cutting machine comprising a support, a stationary platform on said support, an endless belt conveyor rotatable about spaced horizontal axes positioned so that the upper run overlies and is spaced from and adjacent to said platform and the lower run is below and spaced from and adjacent said platform with said axes at opposite ends of said platform, said conveyor having extending thereabout a plurality of transversely-extending bars, the bars being spaced longitudinally apart uniform distances, each bar being provided with a row of outwardly-extending projections, the rows of the respective projections being in longitudinal alignment, the said distances between the respective bars being sufficient to receive potatoes between said transverse rows of projections, a transverse row of depending blade elements mounted on said support and disposed over the upper run of said conveyor and registering longitudinally with the spaces between the projections, a vertically reciprocable transverse vertical blade member mounted on the support adjacent the discharge end of the belt conveyor and overlying the top run thereof, means biasing said transverse vertical blade members downwardly towards a position adjacent the top run of the belt, means to intermittently drive said belt conveyor in steps corresponding substantially to the longitudinal spacing between said transverse rows and to elevate said transverse blade member and release same at the end of each step, and respective transverse supporting rollers underlying the top run of the endless belt subjacent the transverse row of depending blade elements and the vertically reciprocable transverse blade member.

4. A seed potato cutting machine comprising a support, a stationary platform on said support, an endless belt conveyor rotatable about spaced horizontal axes positioned so that the upper run overlies and is spaced from and adjacent said platform and the lower run is below and spaced from and adjacent said platform with said axes at opposite ends of said platform, said conveyor having extending thereabout a plurality of transversely-extending bars, the bars being spaced longitudinally apart uniform distances, each bar being provided with a row of outwardly-extending projections of triangular configuration, the rows of the respective projections being in longitudinal alignment, the said distances between the respective bars being sufficient to receive potatoes between said transverse rows of longitudinally directed elongated vertically arranged inclined yieldable blades pivoted to said support over the belt conveyor and registering longitudinally with the spaces between the projections, said blades being inclined downwardly and toward the discharge end of the belt conveyor, a vertically reciprocable transverse vertical blade member mounted on the support adjacent the discharge end of the belt conveyor and overlying the top run of the belt, means biasing said transverse vertical blade member downwardly towards a position adjacent the top run of the belt, means to intermittently drive said belt conveyor in steps corresponding substantially to the longitudinal spacing between said transverse rows, and means to elevate said transverse blade member and release same at the end of each step.

5. The machine according to claim 2 wherein said projections are all of a triangular configuration.

References Cited in the file of this patent
UNITED STATES PATENTS

| | | |
|---|---|---|
| 2,153,407 | Bell | Apr. 14, 1939 |
| 2,170,512 | Arvanitis | Aug. 22, 1939 |
| 2,495,121 | Moore | Jan. 17, 1950 |
| 2,752,967 | Sylvain | July 3, 1956 |